United States Patent [19]
Harris et al.

[11] Patent Number: 5,265,965
[45] Date of Patent: Nov. 30, 1993

[54] COMPOSITE BALL AND SOCKET BEARING WITH CONVEX OUTER SURFACE

[75] Inventors: Bernard Harris, Northbrook; Dennis E. Bozych, Downers Grove, both of Ill.

[73] Assignee: Rexnord Corporation, Milwaukee, Wis.

[21] Appl. No.: 940,068

[22] Filed: Sep. 2, 1992

[51] Int. Cl.$^5$ .............................. F16C 23/04
[52] U.S. Cl. ........................ 384/208; 384/192; 384/206
[58] Field of Search ............ 384/192, 202–204, 384/206–213, 297, 298, 300

[56] References Cited

U.S. PATENT DOCUMENTS

| 2,047,885 | 7/1936 | Riebe . | |
| 3,084,417 | 4/1963 | Picca | 384/203 X |
| 3,116,539 | 1/1964 | Evans et al. | 29/149.5 |
| 3,428,374 | 2/1969 | Orkin et al. | 384/213 |
| 3,528,714 | 9/1970 | McCloskey | 384/298 |
| 3,536,367 | 10/1970 | Papish | 384/298 |
| 3,616,000 | 10/1971 | Butzow et al. | 156/173 |
| 3,700,295 | 10/1972 | Butzow et al. . | |
| 3,802,756 | 4/1974 | Turner | 384/206 |
| 3,804,479 | 4/1974 | Butzow et al. . | |
| 3,974,009 | 8/1976 | Butzow et al. | 156/84 |
| 3,998,504 | 12/1976 | McCloskey . | |
| 4,134,842 | 1/1979 | Orkin et al. | 252/12.6 |
| 4,846,590 | 7/1989 | Teramachi | 384/208 X |
| 4,848,934 | 7/1989 | Blakely et al. | 384/625 X |

FOREIGN PATENT DOCUMENTS

| 604699 | 9/1960 | Canada | 384/206 |
| 1581892 | 7/1990 | U.S.S.R. | 384/192 |

Primary Examiner—Thomas R. Hannon
Attorney, Agent, or Firm—Michael, Best & Friedrich

[57] ABSTRACT

A spherical bearing subassembly comprising a one-piece integrally formed annular socket member having an axis, axially spaced ends, an axially extending bore, a concave inner raceway facing into the bore and a convex generally spherical outer surface, and a spherical bearing mounted in the concave inner raceway.

12 Claims, 1 Drawing Sheet

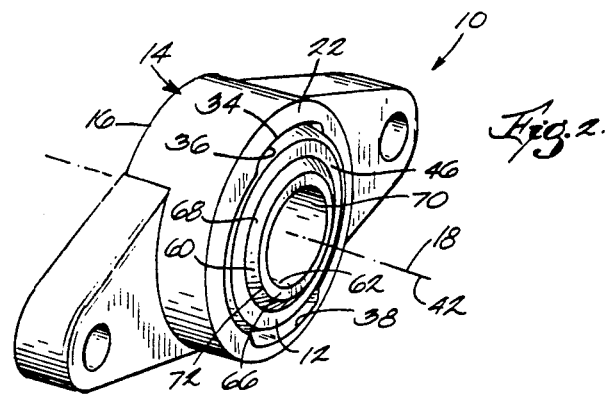
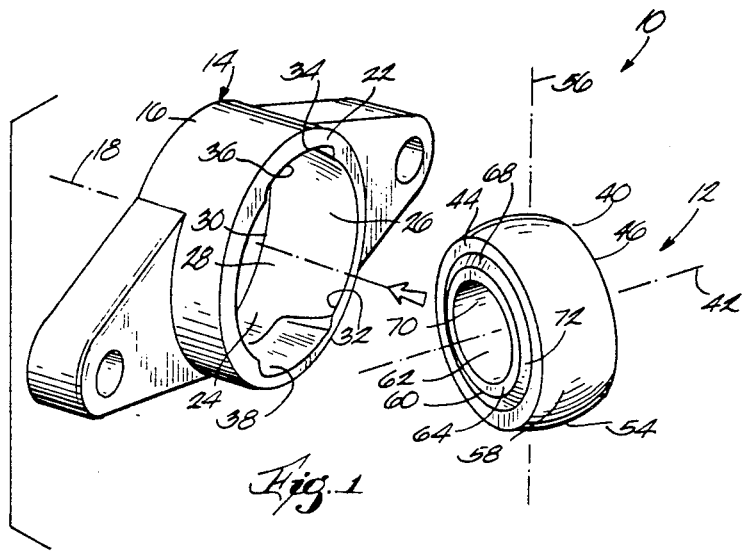
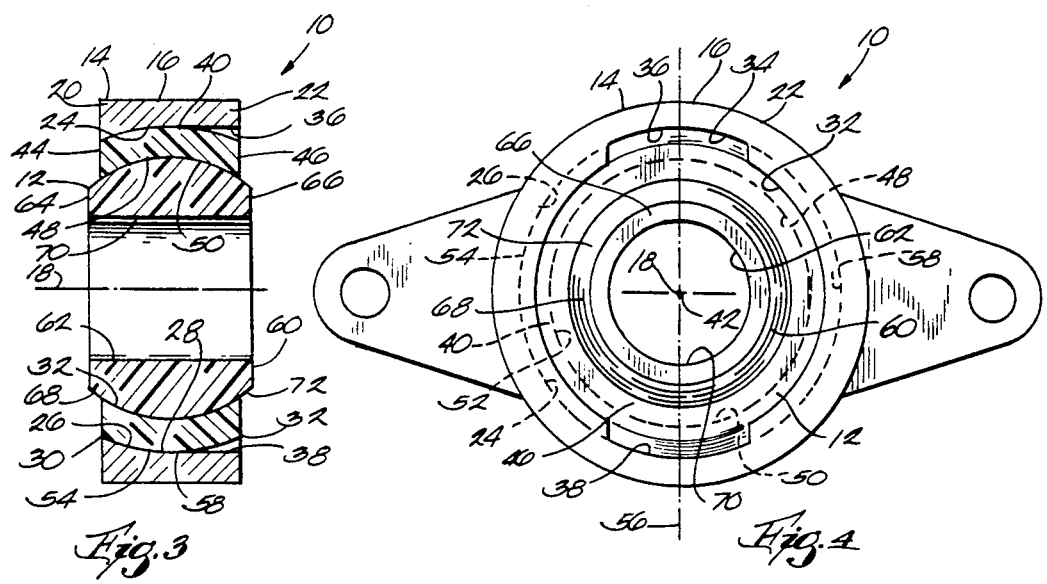

COMPOSITE BALL AND SOCKET BEARING WITH CONVEX OUTER SURFACE

BACKGROUND OF THE INVENTION

This invention relates to composite bearings, and, more particularly, to an improved composite ball and socket bearing.

Spherical journal bearings are designed for applications where both misaligning and oscillatory motions are present. These bearings are also referred to as self-aligning bearings, typically comprising a bearing with a spherical outer diameter, referred to as the ball, mounted within an opening or the socket of a housing, to form the ball and socket bearing. The socket comprises a concave inner surface or raceway that is integral with the housing. In such ball and socket bearings the socket housing is frequently termed a pillow block. The socket inner raceway and the outer spherical diameter of the ball must have a very closely toleranced fit to assure consistent bearing performance and long life.

The ball is often designed to be removable from the socket to allow the ball to be replaced as it wears or as the requirements for the bearing change. Such a removable ball and socket bearing is shown in U.S. Pat. No. 3,116,539, issued to Evans et al. on Feb. 21, 1961, which discloses a socket having slots diametrically spaced apart on one side of the inner diameter of the socket, permitting insertion of the ball into the socket inner raceway. The ball is inserted sideways into the insertion slots and turned ninety degrees to seat the spherical outer diameter of the ball within the socket inner raceway, making the ball easily removable from the socket. The socket may then be permanently mounted and the ball replaced as necessary. The insertion slots reduce the surface area of the concave inner raceway, and must be carefully formed to avoid producing irregularities in the inner raceway surface which might lead to increased wear.

An alternative means for replaceably mounting a ball within a permanently mounted socket is disclosed in U.S. Pat. No. 3,998,504, issued to McCloskey on Dec. 21, 1976. This patent discloses a ball and socket type bearing wherein the inner raceway of the socket member is on a separate three unit intermediate socket member assembled or built up within a bore in the rigid housing member, or pillow block. The intermediate socket is assembled from two partial annular subunits which removably line part of the bore of the pillow block, leaving a small annular gap, or slot for insertion of the ball. The partial subunits have a concave inner surface or raceway for seating the ball in the completed assembly. After the ball has been placed within the partial annular raceway defined by the two partial annular subunits a third subunit, or key, is inserted into the annular gap to complete the intermediate socket and the ball is turned to seat the spherical outer surface thereof within the newly completed three piece raceway.

A problem with this bearing arrangement is that an installation clearance must exist between the interfaces created between the three socket subunits. Because of such clearances the interfacing edges of the subunits cannot be perfectly aligned annularly along the inner raceway, and the play existing between the interfacing edges make it impossible to produce a tightly toleranced fit between the inner raceway of the assembled intermediate socket and the spherical outer diameter of the ball inserted therein. These interfaces break up the smooth surface of the inner race and lead to increased wear of the bearing surface.

One solution to the problem of maintaining a close toleranced fit between the ball outer surface and the socket inner raceway is to permanently mount the spherical ball in the inner raceway of the socket member, to produce a unitary ball and socket bearing. Many such bearings are known having metallic socket members permanently forged or otherwise formed onto metallic balls. Such unitary ball and socket bearings are difficult and expensive to manufacture, and there is always a risk of the final assembly causing damage to either the ball outer surface or the socket inner raceway which would adversely affect the close tolerance bearing interface. Further with this design the ball is not replaceable and therefor the housing containing the socket cannot be permanently mounted.

Another type of composite ball and socket bearing is disclosed in U.S. Pat. Nos. 3,700,295 and 3,974,009, both issued to Butzow et al., on Oct. 24, 1972 and Aug. 10, 1976, respectively. This bearing comprises a resin-impregnated filament-wound annular intermediate socket member having a concave inner raceway and a corrosion resistant spherical steel ball, which overall produces a lightweight, corrosion-resistant composite ball and socket bearing. This combination of a ball and an intermediate socket member will be referred to as a bearing subassembly because it is designed to be replaceably mounted within a permanently mounted socket housing or pillow block. The bearing subassembly also has a self-lubricating surface of a low friction material, such as a woven Teflon fabric, on the inner raceway of the annular intermediate socket member, which is produced by a method comprising applying the fabric over the spherical steel bearing assembled on a mandrel and then building up the body of the annular intermediate socket member over the fabric by repeatedly winding resin-impregnated fiberglass filaments about the fabric. The resulting resinous body is subsequently cured to harden the resin. The inner raceway surface thus comprises a layer of Teflon fabric, which forms a low friction bearing surface against the outer surface of the steel ball. This type of bearing subassembly also provides the desired tightly toleranced fit between the outer spherical diameter of the ball and the intermediate socket inner raceway. With a fiberglass intermediate socket member formed over a steel ball in this fashion, a replaceable bearing subassembly is produced which is lighter, less expensive and easier to manufacture than a bearing subassembly having a metallic socket member formed over a metallic ball.

The intermediate socket member must be mounted and then retained within the socket of the pillow block housing without affecting the freedom of the ball to rotate within the intermediate socket member. The socket of these composite bearing subassemblies typically comprises a cylindrical bore in the pillow block housing. The intermediate socket member is provided with a cylindrical outer diameter dimensioned to fit within the cylindrical bore of the pillow block, with the pillow block bore functioning as a socket for the bearing subassembly. This provides a three piece bearing assembly comprising the pillow block, the intermediate annular socket member and the spherical ball.

Because such a bearing subassembly will be exposed to both misalignment and radial loads, the mounting of the bearing subassembly frequently fails before the bearing subassembly wears out and such mounting failure may also damage the pillow block housing necessitated by its replacement. Mounting of the bearing subassembly by press fitting, bonding or by retaining means such as snap rings, machined shoulders or swaged collars have all been utilized to retain the bearing subassembly in the pillow block socket.

Problems exist for these solutions, however. Bonding of the intermediate socket member within the pillow block bore is permanent, because it makes replacing of the bearing subassembly all but impossible, and is not preferred for this reason. The retaining means are undesirable because they create stress points which frequently translate into early failure of the fiberglass intermediate socket member, particularly in applications with high force dynamic axial loads, due to galling, chipping or fracturing. In such applications bearing subassemblies having a fiberglass annular intermediate socket member tend to be less durable than similar ball and socket composites having both metallic balls and metallic intermediate socket members, but high axial or radial loads may cause high wear rates or even failure in the mounting region of metallic components. Therefore an improved ball and socket bearing is needed which will have a bearing subassembly that will have a one piece intermediate socket member replaceably mounted on the pillow block in a manner that will not lead to unacceptably high wear or premature failure of either the intermediate socket member or the pillow block in which it is mounted. The replaceable mounting must allow the bearing subassembly to be easily removed and replaced while securing the bearing subassembly to send radial and axial loads.

SUMMARY OF THE INVENTION

The primary object of the invention is to provide a composite bearing having a replaceable spherical bearing subassembly of superior strength and durability.

A more specific object is to provide such a bearing with a subassembly which can be easily manufactured and which is simple to install and remove from its housing.

Another object is to provide such a bearing subassembly having an intermediate socket member that is self-securing upon installation without the use of bonding or retaining means such as locking rings or collars.

The achievement of these and other objects is provided by a spherical bearing subassembly comprising a one-piece annular intermediate socket member and a spherical bearing mounted in the concave inner raceway of the intermediate socket member. The intermediate socket member generally comprises an annular body having an axis and axially spaced ends. An axially extending bore spans the ends and a concave inner raceway faces into the bore. The concave inner raceway of the intermediate socket member preferably includes a bearing surface comprising a liner of self-lubricating material integrally bonded to the inner raceway. This self-lubricating material may comprise a fabric woven from fibers of the self-lubricating material. Alternatively, the outer diameter of the spherical bearing may comprise a low-friction bearing surface. A convex surface is machined on the outer diameter of the body of the intermediate socket member.

When installed into the bore of a pillow block housing having a concave mounting socket dimensioned complementary to the convex outer surface of the intermediate socket member, a spherical interface between the outer surface of the intermediate socket member and the mounting socket of the pillow block is created. The spherical interface restrains the bearing against axial movement without the use of any further bonding or retaining means. This interface may be dimensioned to very close tolerances, as it isn't intended or required that significant movement occur between the intermediate socket member and the pillow block housing, and for most applications a tight interface will be preferable.

An insertion slot means is provided in the pillow block housing mounting socket to permit easy installation and removal of the bearing subassembly into the mounting socket. The insertion slot means extends generally axially from one of the sides of the pillow block into the pillow block bore. The insertion slot means more specifically comprises two insertion slots diametrically spaced apart a distance that is at least equal to the maximum diameter of the bore, and the insertion slot means terminates adjacent the maximum diameter of the concave mounting socket. The intermediate socket member has an installation axis extending transversely to the pillow block and socket axes, with an axial width slightly less than the width of the insertion slot means to permit the intermediate socket member to be orientated about the installation axis and inserted into the insertion slot means and then turned about the installation axis to seat the convex outer surface of the intermediate socket member in the pillow block concave inner race. Thus the bearing subassembly is easily insertable into and removable from the bore of a pillow block housing having a concave inner socket.

Other features or advantages of the invention will become apparent to those of ordinary skill in the art upon review of the following detailed description, claims and drawings.

BRIEF DESCRIPTION OF THE DRAWINGS

FIG. 1 discloses the composite ball and socket bearing of the invention with the bearing subassembly situated near the pillow block housing, and oriented for insertion therein.

FIG. 2 is a perspective view of the bearing subassembly inserted in the mounting socket of the pillow block.

FIG. 3 is a radial cross section of a bearing subassembly in the mounting socket of the pillow block.

FIG. 4 depicts an axial view of the composite bearing inserted in the housing.

DESCRIPTION OF THE PREFERRED EMBODIMENT

Referring to FIG. 1, the invention generally provides a composite ball and socket bearing 10 of the type including a bearing subassembly 12 which can be inserted and retained, or housed within a pillow block 14 without retaining means.

The pillow block housing 14 is best shown in FIG. 2 and comprises a body 16 having an axis 18 and axially spaced sides 20 and 22. Extending between the axial sides 20 and 22 is an axially extending bore 24. A concave mounting surface, or socket 26 faces into the bore 24. The mounting socket 26 has a circumferential region of maximum diameter 28. The diameter of the mounting socket 26 diminishes in either axial direction to opposed circumferential regions of minimum diameter 30 and 32 at the pillow block sides 20 and 22 respectively.

Insertion slot means 34 extends axially from one of the sides 20 into the pillow block bore 24 and terminates adjacent the circumferential region 28 (FIG. 1). The insertion slot means 34 preferably comprises two insertion slots 36 and 38 diametrically spaced apart a distance that is at least equal to the diameter of the region of maximum diameter 28 in the concave mounting socket 26. A low-friction bearing surface, not shown, may line the concave mounting socket 26, if desired.

The composite ball and socket bearing 10 also includes a spherical bearing subassembly 12 (FIG. 1). The bearing subassembly 12 generally includes a one piece, integrally formed annular intermediate socket member 40 having a socket axis 42 and axially spaced ends 44 and 46 (FIGS. 1 and 2). An axial socket bore 48 extends between the axial ends 44 and 46 and a concave inner raceway 50 is formed in, and faces into, the socket bore 48. The concave inner raceway 50 provides a bearing surface, such as a liner of self-lubricating low-friction material 52 integrally bonded to the concave inner raceway 50. The self-lubricating material 52 may comprise a fabric woven from fibers of self-lubricating material, and if the intermediate socket member 40 is of fiberglass, the material 52 may be bonded to the concave inner raceway 50 by the method disclosed in the U.S. Pat. Nos. 3,700,295 and 3,974,009 referenced above. A preferred intermediate socket member 40 will comprise a hardened resin body reinforced by glass filaments which includes the self-lubricating low-friction material lining the concave inner raceway 50.

A convex, generally spherical outer surface 54 is ground or otherwise machined on the outer diameter of the one piece intermediate socket member 40. The convex outer surface 54 is dimensioned complementary to the concave mounting socket 26 facing into the pillow block bore 24.

The one piece intermediate socket member 40 also has an installation axis 56 extending transversely to the pillow block axis 18 and the socket axis 42. The width across the axially spaced intermediate socket ends 44 and 46 is slightly less than the width of the insertion slot means 34, which permits the one piece intermediate socket member 40 of the subassembly 12 to be orientated about the installation axis 56 and inserted into the insertion slot means 34 and then turned about the installation axis 56 to seat the convex outer surface 54 of the one piece intermediate socket member 40 in the pillow block concave mounting socket 26, thereby installing the bearing subassembly 12 within the pillow block 14 (FIGS. 2 through 4).

The bearing subassembly 12 can similarly be removed from the pillow block 14 by simply turning the intermediate socket member 40 ninety degrees (90°) about the installation axis 56 to align the intermediate socket member 40 with the insertion slot means 34 and then sliding the intermediate socket member 40 away from the pillow block 14 along the pillow block axis 18.

A layer of self-lubricating material 58, such as a Teflon fabric, may be bonded to the convex outer surface 54 of the one piece intermediate socket member 40, if relative movement of the convex outer surface 54 and the mounting socket 26 of the pillow block 14 is desired. A method for integrally bonding self-lubricating material to an external surface of a substratum to form a self-lubricating surface thereon is disclosed in our copending application titled "METHOD OF BONDING SELF-LUBRICATING FIBERS TO AN EXTERNAL SURFACE OF A SUBSTRATUM", filed on Aug. 26, 1992, Ser. No. 935,820 and assigned to assignee hereof and which is incorporated herein by reference. The method briefly comprises the steps of forming the substratum to provide an external surface thereon of desired configuration and applying a layer of self-lubricating material onto the surface. A plurality of filaments are applied on the layer of self-lubricating material to form an overlayment thereon to exert a bonding pressure sufficient to cause the layer of self-lubricating material to conform and bond to the configured external surface. A hardenable liquid resin is applied prior to, simultaneously with, or subsequent to the application of the self-lubricating material and filaments to coat the material and filaments and fill any interstices that exist. This resin is hardened, after which all or part of the overlayment is removed to expose the layer of self-lubricating material or portions thereof on the external surface.

The bearing subassembly 12 also includes a spherical bearing, or ball 60 mounted within the one piece annular intermediate socket member 40, which is free to move and to rotate within the intermediate socket member 40 (FIG. 3). The ball 60 is preferably machined from a suitable steel alloy having such resistance to wear and corrosion as may be required. The ball 60 is typically provided with a central cylindrical bore 62 for receiving the shaft, not shown, of whatever part the subassembly 12 is to be mounted on. The ball 60 is also provided with flat circular end faces 64 and 66. The entire spherical surface between end faces 64 and 66 forms the bearing surface 68 of the ball. The spherical bearing surface 68 is ground to the required final dimension before fabrication of the subassembly 12 and the bearing surface 68 may be anodized or electroplated to achieve a desired level of surface finish. The ball 60 is free to misalign or to rotate within the intermediate socket member 40 with bearing surface 68 in contact with the concave inner raceway 50.

The ball 60 may alternatively be produced of a fiberglass material, and the central bore 62 may optionally include a bearing surface comprising a layer of self-lubricating material 70 integrally bonded thereto. The ball 60 may also have its external bearing surface 68 lined by self-lubricating material 72 integrally bonded thereto, produced by the method described above for applying self-lubricating material to the convex outer surface 54.

After the intermediate socket member 40 has been placed into the insertion slot means 34 and turned into the pillow block bore 24 ninety degrees (90°) the intermediate socket member 40 is sandwiched between the spherical ball 60 and the pillow block 14 and the bearing subassembly 12 is ready to support a load as soon as a shaft is assembled into the cylindrical bore 62.

This bearing subassembly 12 represents an improvement over bearings of the prior art which have a cylindrical outer surface on the one piece intermediate socket member 40, which require bonding or the use of a snap ring for retention in the pillow block as previously explained. The spherical interface between the convex outer surface 54 of the intermediate socket member 40 and the pillow block mounting socket 26 traps the bearing subassembly 12 against relative axial movement without or use of snap rings or bonding, by providing thrust bearing surfaces resisting forces in the axial direction thereby increasing the axial strength, or axial load capacity of the bearing. The intermediate socket 40 is retained against axial movement in either direction by the contact convex outer surface 54 makes with the pillow block mounting socket 26 from the circumferential region of maximum diameter 28 out to the circumferential regions of minimum diameter 30 or 32 (FIG. 4). At this region of contact the convex outer surface 54 can misalign with the pillow block mounting socket 26, due to the spherical interface therein. The use of a bearing subassembly having a one piece intermediate socket member with a convex outer surface 54 will thus extend the acceptable working range of misalignment of the bearing 10 without jeopardizing the axial thrust resisting ability of the bearing assembly.

When tested for radial static strength it was discovered that a one piece intermediate socket member 40 having a spherical, or convex outer surface provides a bearing subassembly having unanticipated superior radial load supporting capability as compared to a bearing subassembly that includes an intermediate socket member having a cylindrical outer surface as will now be explained.

Different bearing subassemblies were tested, each consisting of a steel spherical ball surrounded by a filament wound outer intermediate socket, the only difference between subassemblies being that the intermediate sockets were manufactured with either convex or cylindrical outer surfaces. The winding angle for the glass fibers in all of the intermediate sockets was seventy five degrees (75°). All of the steel balls had an outer surface of 1.56 inches and a bore of 0.75 inch. The diameters of both the convex and the cylindrical fiberglass intermediate socket members were 1.75 inches and their outer surface were each 0.80 inch wide. Four samples of each intermediate socket configuration were tested.

The bearing subassemblies of the prior art, having cylindrical outer one piece intermediate surface sockets, were installed in a straight bore loading plate and a test pin was inserted through the bore of their steel balls, with the pin ends supported by heavy sideplates on each side. The deflection of the loading plate due to a radially applied load was measured and load versus deflection traces were obtained during the test. The test was conducted by applying increasing radial loads until radial crushing was evident from the trace, indicating failure.

The bearing subassemblies of the invention, having convex outer surface one piece intermediate sockets, were similarly tested using a special loading plate with a spherical bore and a slotted access hole. The sockets were installed in the loading plate, and loaded as described above for the bearing subassemblies having cylindrical outer surface sockets.

The cylindrical outer surface socket samples failed on average when subjected to 37,725 pounds and deflected an average of 0.0199 inches. Upon removal from the apparatus all of the samples showed obvious visually apparent cracks which distorted the bearing subassembly to a non-functional shape.

The convex outer surface sockets were tested under a load of 100,000 pounds with a corresponding average deflection of 0.0258 inches. These samples showed no signs of failure on the load versus deflection traces, and no obvious visually apparent cracks appeared. Three of these samples were rotated 180° and again subjected to 150,000 pounds. The test pins began to shear before failure was shown by the trace, causing termination of the test at 150,000 pounds, although at this load level the samples showed some visual signs of failure.

The above tests were designed to compare radial static strengths for convex and cylindrical outer surface intermediate sockets. In general, the convex one piece intermediate socket was found to support nearly four times more radial load than the prior art cylindrical intermediate sockets before failure. The convex outer surface sockets were radially loaded to 150,000 pounds without significant failure, after which the test was terminated due to shearing of the loading pin with the bearing subassemblies still being functional. In contrast, the cylindrical intermediate socket bearings outer rings reached an average radial static load of only about 37,725 pounds before failure. Thus, in addition to the improvements to axial strength and retention provided by the bearing subassembly of the invention, the one piece convex intermediate socket provides an additional unexpected advantage in improved radial load sustaining capability. From the foregoing description, one skilled in the art can make various changes and modifications to adapt the invention to various usages and conditions without departing from the spirit and scope of the invention.

What is claimed is:

1. A composite ball and a socket bearing comprising:
   an outer pillow block including an axis, an axially extending bore, axially spaced sides, a concave mounting socket facing into said bore and having a circumferential region of maximum diameter, and an insertion slot means extending axially from one of said sides into said bore and terminating adjacent said circumferential region; and
   a spherical bearing subassembly removably mounted in said concave mounting socket including
      a one-piece annular intermediate socket member having axially spaced ends, an axis, an axially extending bore, a convex outer surface dimensioned complementary to said concave mounting socket in said pillow block, a concave inner raceway, and an installation axis extending transversely to said pillow block and socket member axes, said intermediate socket member having an axial width slightly less than the width of said insertion slot means to permit said intermediate socket member to be orientated about said installation axis and inserted into said insertion slot means and then turned about said installation axis to seat said convex outer surface of said intermediate socket member in said pillow block mounting socket, and
      a spherical bearing mounted in said concave inner raceway of said intermediate socket member.

2. The composite ball and socket bearing according to claim 1 wherein said insertion slot means comprises two insertion slots diametrically spaced apart a distance that is at least equal to the diameter of said region of maximum diameter.

3. The composite ball and socket bearing according to claim 1 wherein said concave inner raceway of said intermediate socket member includes a bearing surface comprising a liner of self-lubricating material integrally bonded to said inner raceway.

4. The composite ball and socket bearing according to claim 3 wherein said self-lubricating material comprises a fabric woven from fibers of said self-lubricating material.

5. The composite ball and socket bearing according to claim 1 wherein said spherical bearing includes an outer bearing surface comprising a liner of self-lubricating material integrally bonded thereto.

6. The composite ball and socket bearing according to claim 1 wherein said spherical bearing includes a central bore having an interior bearing surface comprising a layer of self-lubricating material integrally bonded thereto.

7. A spherical bearing assembly comprising:
 a one-piece integrally formed annular socket member having a socket member axis, axially spaced ends, an axially extending bore, a concave inner raceway facing into said bore and a convex generally spherical outer surface;
 a spherical bearing mounted in said concave inner raceway;
 an outer pillow block having a pillow block axis, an axially extending pillow block bore, axially spaced sides, a concave mounting socket facing into said pillow block bore dimensioned complementary to said convex generally spherical outer surface on said socket member and having a circumferential region of maximum diameter, and an insertion slot means extending axially from one of said sides into said pillow block bore and terminating adjacent said circumferential region; and
 said socket member having an installation axis extending transversely to said pillow block and socket member axes, and an axial width slightly less than the width of said insertion slot means to permit said socket member to be orientated about said installation axis and inserted into said insertion slot means and then turned about said installation axis to seat said convex generally spherical outer surface of said socket member in said pillow block mounting socket.

8. The bearing subassembly according to claim 7 wherein said insertion slot means comprises two insertion slots diametrically spaced apart a distance that is at least equal to the diameter of said region of maximum diameter.

9. The bearing subassembly according to claim 7 wherein said concave inner raceway of said socket member includes a bearing surface comprising a liner of self-lubricating material integrally bonded to said inner raceway.

10. The bearing subassembly according to claim 9 wherein said self-lubricating material comprises a fabric woven from fibers of said self-lubricating material.

11. A spherical bearing subassembly comprising:
 a one-piece integrally formed annular socket member having an axis, axially spaced ends, an axially extending bore, a concave inner raceway facing into said bore and a convex generally spherical outer surface; and
 a spherical bearing mounted in said concave inner raceway, said spherical including an outer bearing surface comprising a liner of self-lubricating material integrally bonded thereto.

12. The bearing subassembly according to claim 11 wherein said spherical bearing includes a central bore having an interior bearing surface comprising a layer of self-lubricating material integrally bonded thereto.

* * * * *